United States Patent
Bergström et al.

(10) Patent No.: US 11,678,218 B2
(45) Date of Patent: Jun. 13, 2023

(54) DEFERRING A TRANSMISSION OF A MESSAGE

(71) Applicant: Telefonaktiebolaget LM Ericsson (publ), Stockholm (SE)

(72) Inventors: Mattias Bergström, Sollentuna (SE); Anders K Eriksson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/473,646

(22) PCT Filed: Feb. 2, 2018

(86) PCT No.: PCT/SE2018/050084
§ 371 (c)(1),
(2) Date: Jun. 26, 2019

(87) PCT Pub. No.: WO2018/143881
PCT Pub. Date: Aug. 9, 2018

(65) Prior Publication Data
US 2019/0349807 A1    Nov. 14, 2019

Related U.S. Application Data

(60) Provisional application No. 62/454,592, filed on Feb. 3, 2017.

(51) Int. Cl.
*H04W 28/02* (2009.01)
*H04L 47/32* (2022.01)
(Continued)

(52) U.S. Cl.
CPC ......... *H04W 28/0289* (2013.01); *H04L 47/32* (2013.01); *H04L 69/28* (2013.01);
(Continued)

(58) Field of Classification Search
CPC ......... H04W 28/0289; H04W 28/0268; H04W 48/06; H04W 80/02; H04L 47/32; H04L 69/28
See application file for complete search history.

(56) References Cited

U.S. PATENT DOCUMENTS 9,386,128 B2 * 7/2016 Ehsan ................ H04L 47/283
10,051,507 B2   8/2018 Hsu et al.
(Continued)

FOREIGN PATENT DOCUMENTS

CN    103069911 A    4/2013
CN    105393626 A    3/2016
(Continued)

OTHER PUBLICATIONS

Asustek, "The Operation of Logical Channel SR Prohibit Timer for VoIP", 3GPP TSG-RAN2 Meeting #90, Fukuoka, Japan, May 25, 2015, pp. 1-4, R2-152398, 3GPP.
(Continued)

*Primary Examiner* — Donald L Mills
(74) *Attorney, Agent, or Firm* — Coats & Bennett, PLLC

(57) ABSTRACT

Systems and methods of deferring a transmission of a message are provided. In one exemplary embodiment, a method by a wireless device (105, 200, 300*a-b,* 600) comprises determining (1001) whether a timer (106, 205) associated with deferring a transmission (107) of a message (113) on a certain uplink or downlink logical channel is configured and not running for that certain uplink or downlink logical channel. Further, the method includes transmitting (1011), to a network node (101), the message on that certain uplink or downlink logical channel responsive to determining that the timer is configured and not running for that certain uplink or downlink logical channel.

22 Claims, 13 Drawing Sheets

(51) Int. Cl.
*H04L 69/28* (2022.01)
*H04W 48/06* (2009.01)
*H04W 80/02* (2009.01)

(52) U.S. Cl.
CPC ....... *H04W 28/0268* (2013.01); *H04W 48/06* (2013.01); *H04W 80/02* (2013.01)

(56) References Cited

U.S. PATENT DOCUMENTS

| | | | |
|---|---|---|---|
| 2002/0159396 A1* | 10/2002 | Carlson | H04L 47/32 370/252 |
| 2006/0013257 A1 | 1/2006 | Vayanos | |
| 2008/0194259 A1 | 8/2008 | Vujcic et al. | |
| 2010/0309788 A1 | 12/2010 | Ho et al. | |
| 2011/0090856 A1 | 4/2011 | Cho et al. | |
| 2012/0039295 A1 | 2/2012 | Quan et al. | |
| 2012/0207040 A1 | 8/2012 | Comsa et al. | |
| 2012/0281564 A1* | 11/2012 | Zhang | H04L 1/08 370/252 |
| 2014/0019581 A1* | 1/2014 | Baillargeon | H04L 41/0613 709/217 |
| 2014/0087756 A1* | 3/2014 | Erol | H04W 4/023 455/456.1 |
| 2014/0098755 A1* | 4/2014 | Shi | H04W 60/02 370/329 |
| 2016/0157256 A1 | 6/2016 | Tseng | |
| 2017/0187635 A1* | 6/2017 | Subasingha | H04L 47/283 |
| 2018/0139131 A1* | 5/2018 | Ignatchenko | H04L 69/16 |
| 2019/0230736 A1* | 7/2019 | Quan | H04L 5/0044 |

FOREIGN PATENT DOCUMENTS

| | | |
|---|---|---|
| EP | 2830279 A1 | 1/2015 |
| RU | 2429567 C2 | 9/2011 |
| RU | 2011148146 A | 6/2013 |
| RU | 2557767 C2 | 7/2015 |
| WO | 1999000958 A1 | 1/1999 |

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protoco specification (Release 14)", Technical Specification, 3GPP TS 36.321 V14.1.0, Dec. 1, 2016, pp. 1-98, 3GPP, France.

Kyocera, "Feedback aspects for RAN-assisted codec rate adaptation", 3GPP TSG-RAN WG2 #96, Reno, USA, Nov. 14, 2016, pp. 1-7, R2-168033, 3GPP.

Huawei, et al., "Introduction of Voice and Video enhancements for LTE", Change Request, 3GPP TSG-RAN2 Meeting #96, Reno, USA, Nov. 14, 2016, pp. 1-18, R2-169176, 3GPP.

LG Electronics Inc., "Packet duplication in NR", 3GPP TSG-RAN WG2 NR Ad Hoc, Spokane, USA, Jan. 17, 2017, pp. 1-3, R2-1700423, 3GPP.

\* cited by examiner

1100

R/R/E/LCID sub-header

DEFERRING A TRANSMISSION OF A MESSAGE

FIELD OF DISCLOSURE

The present disclosure relates generally to the field of communications, and in particular to deferring a transmission of a message.

BACKGROUND

In current Third Generation Partnership Project (3GPP) Long Term Evolution (LTE) standards specifications, there are prohibit timers used to prohibit a User Equipment (UE) from sending certain messages too often. This ensures that system capacity is protected and interference due to unnecessary or unwanted transmissions is kept low. One example of a message that may be prevented from being sent too often is a Medium Access Control (MAC) Control Element (CE). A MAC CE sends control information between two entities in a communication link at the MAC layer. As shown in FIG. 11, a MAC Protocol Data Unit (PDU) sub-header for a fixed-sized MAC CE consists of the four header fields Reserved (R), Reserved (R), Extension (E), and Logical Channel Identifier (LCID), with this sub-header also being referred by its fields as R/R/E/LCID. An LCID defines the type of CE. Table 1 and Table 2 below show values used for 3GPP LTE Downlink Shared Channel (DL-SCH) and Uplink shared channel (UL-SCH).

TABLE 1

MAC Control Elements for DL-SCH

| Index | LCID values | Size |
| --- | --- | --- |
| 01011-11010 | Reserved for future needs | N/A |
| 11011 | Activation/Deactivation | 1 |
| 11100 | UE Contention Resolution Identity | 6 |
| 11101 | Timing Advance Command | 1 |
| 11110 | DRX Command | 0 |

TABLE 2

MAC Control Elements for UL-SCH

| Index | LCID values | Size |
| --- | --- | --- |
| 01011-11000 | Reserved for future needs | N/A |
| 11001 | Extended Power Headroom Report | variable |
| 11010 | Power Headroom Report | 1 |
| 11011 | C-RNTI | 2 |
| 11100 | Truncated BSR | 1 |
| 11101 | Short BSR | 1 |
| 11110 | Long BSR | 3 |

The MAC control element itself is coded in the payload part of the MAC PDU. Different sizes are used depending on the details of the particular control. In the simplest case, the size is '0' and the function is already fully determined by the sub-header. The size of a MAC CE can also be variable. An example of a MAC CE, which may have restrictions on the interval for transmissions, is a UE query on recommended bit rate for a particular LCID in an uplink or downlink direction (UL/DL), as described in FIG. 12. Another example of a message that may be prevented to be sent based on a prohibit timer is a Packet Data Convergence Protocol (PDCP) control PDU.

Control information may be sent between two entities in a communication link using a PDCP control PDU. Currently, a PDCP control PDU is used to convey a PDCP status report indicating which PDCP Service Data Units (SDUs) are missing and which are not following a PDCP re-establishment, or header compression control information, e.g., interspersed Robust Header Compression (ROHC) feedback. With reference to the example of the PDCP control PDU for ROHC feedback in FIG. 13, the PDCP control PDU is identified via the Data or Control (D/C) bit set to '1' and the PDU Type bit field. Table 3 below shows values used for 3GPP control PDUs.

TABLE 3

PDCP control PDU types

| Bit | Description |
| --- | --- |
| 000 | PDCP status report |
| 001 | Interspersed ROHC feedback packet |
| 010 | LWA status report |
| 011-111 | Reserved |

In some scenarios, such as when the UE transmits MAC CEs to query the eNB regarding the recommended bit rate, the UE transmits the same or similar message multiple times even during a short period of time, resulting in wasted network resources and bandwidth. Accordingly, there is a need for improved techniques for deferring a transmission of the same or similar message. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

According to one aspect, a method by a wireless device comprises deferring transmission of a first message for at least a certain time period following transmission of a second message that is at least a partial copy of the first message.

According to another aspect, the step of deferring includes waiting to generate the first message until at least the certain time period has passed.

According to another aspect, the step of deferring includes determining not to transmit the first message.

According to another aspect, the step of determining not to transmit is responsive to determining a change in a condition of the wireless device.

According to another aspect, the step of determining not to transmit is responsive to determining that the first message is no longer applicable.

According to another aspect, the method includes determining whether the second message is at least a partial copy of the first message. Further, the step of deferring is responsive to determining that the second message is at least a partial copy of the first message.

According to another aspect, the method includes transmitting the first message after the certain time period.

According to another aspect, the method includes determining whether the first and second messages are either both associated with uplink transmissions or both associated with downlink transmissions. Also, the step of deferring is responsive to determining that the first and second messages are either both associated with uplink transmissions or both associated with downlink transmissions.

According to another aspect, the method includes running a timer to indicate an expiration after the certain time period responsive to transmitting the second message.

According to another aspect, the method includes transmitting the first message responsive to determining that the timer indicates that the certain time period has expired.

According to another aspect, the method includes running the timer to indicate an expiration after the certain time period responsive to transmitting the first message.

According to another aspect, the timer is selected based on whether the first and second messages are either both associated with uplink transmissions or both associated with downlink transmissions.

According to another aspect, the timer is selected based on whether a bit rate indicated by the first message is or is not meeting a certain criteria of a logical channel that is associated with the first and second messages.

According to another aspect, the certain criteria is based on whether the bit rate indicated by the first message is different from a current bit rate assigned to the logical channel.

According to another aspect, the timer is selected based on whether the first and second messages are associated with a same logical channel.

According to another aspect, the partial copy of the first message refers to at least one field of the message having a same value as a corresponding field in the second message.

According to another aspect, the partial copy of the first message refers to each of a combination of fields of the first message having a same value as corresponding fields in the second message.

According to another aspect, the partial copy of the first message refers to a certain field of the first message having a value that is within a predetermined threshold of a value of a corresponding field in the second message.

According to another aspect, the method includes receiving, from a network node, an indication of the certain time period.

According to another aspect, the first and second messages are associated with querying a network node about a recommended bit rate (RBR).

According to another aspect, the first and second messages are either both associated with uplink transmissions or both associated with downlink transmissions.

According to another aspect, the first and second messages are associated with a same logical channel.

According to another aspect, the method includes determining whether the first and second messages are associated with a same logical channel. In addition, the step of deferring is responsive to determining that the first and second messages are associated with the same logical channel.

According to another aspect, the message is a control element (CE).

According to another aspect, the message is a medium access control (MAC) CE.

According to another aspect, the message is a control protocol data unit (PDU).

According to another aspect, the message is a packet data convergence protocol (PDCP) control PDU.

According to another aspect, the method includes determining whether a timer associated with deferring a transmission of the message on a certain uplink or downlink logical channel is configured and not running for that certain uplink or downlink logical channel. Further, the step of transmitting the message on that certain uplink or downlink logical channel is responsive to determining that the timer is configured and not running for that certain uplink or downlink logical channel.

According to one aspect, a wireless device is configured to defer transmission of a first message for at least a certain time period following transmission of a second message that is at least a partial copy of the first message.

According to one aspect, a wireless device comprises at least one processor and a memory. Further, the memory comprises instructions executable by the at least one processor, whereby the wireless device is configured to defer transmission of a first message for at least a certain time period following transmission of a second message that is at least a partial copy of the first message.

According to one aspect, a wireless device comprises a deferring module for deferring transmission of a first message for at least a certain time period following transmission of a second message that is at least a partial copy of the first message.

According to one aspect, a computer program comprises instructions which, when executed on at least one processor of a wireless device, cause the at least one processor to defer transmission of a first message for at least a certain time period following transmission of a second message that is at least a partial copy of the first message. Further, a carrier may contain the computer program with the carrier being one of an electronic signal, optical signal, radio signal, or computer readable storage medium.

According to one aspect, a method by a wireless device comprises determining whether a timer associated with deferring a transmission of a message on a certain uplink or downlink logical channel is configured and not running for that certain uplink or downlink logical channel. Further, the method includes transmitting, to a network node, the message on that certain uplink or downlink logical channel responsive to determining that the timer is configured and not running for that certain uplink or downlink logical channel.

According to another aspect, the method includes determining not to transmit the message responsive to determining that the timer is configured and running for that certain uplink or downlink logical channel.

According to another aspect, the method includes generating the message responsive to determining that the timer is configured and not running for that certain uplink or downlink logical channel.

According to another aspect, the method includes running the timer responsive to determining that the timer is configured and not running for that certain uplink or downlink logical channel.

According to another aspect, the method includes determining whether radio resources are allocated or not allocated for a transmission on that certain uplink or downlink logical channel. Further, the step of transmitting includes transmitting the message on the allocated radio resources responsive to determining that the radio resources are allocated for the transmission on that certain uplink or downlink logical channel.

According to another aspect, the method includes generating the message responsive to determining that the radio resources are allocated for the transmission on that certain uplink or downlink logical channel.

According to another aspect, the method includes running the timer responsive to determining that the radio resources are allocated for the transmission on that certain uplink or downlink logical channel.

According to another aspect, the method includes determining whether allocated radio resources for a transmission on that certain uplink or downlink logical channel can accommodate or not accommodate the message. Further, the step of transmitting is responsive to determining that the allocated radio resources accommodate the transmission of the message on that certain uplink or downlink logical channel.

According to another aspect, the step of determining whether the allocated radio resources can accommodate or not accommodate the message is based on logical channel prioritization.

According to another aspect, the method includes generating the message responsive to determining that the radio resources are allocated for the transmission on that certain uplink or downlink logical channel.

According to another aspect, the method includes running the timer responsive to determining that the radio resources are allocated for the transmission on that certain uplink or downlink logical channel.

According to another aspect, the message is a MAC CE.

According to another aspect, the message is a recommended bit rate MAC CE.

According to another aspect, the message is associated with querying a network node for an RBR.

According to another aspect, the timer is a bit rate query prohibit timer.

According to one aspect, a wireless device is configured to determine whether a timer associated with deferring a transmission of a message on a certain uplink or downlink logical channel is configured and not running for that certain uplink or downlink logical channel. Further, the wireless device is configured to transmit, to a network node, the message on that certain uplink or downlink logical channel responsive to determining that the timer is configured and not running for that certain uplink or downlink logical channel.

According to one aspect, a wireless device comprises at least one processor and a memory. Further, the memory comprises instructions executable by the at least one processor, whereby the wireless device is configured to determine whether a timer associated with deferring a transmission of a message on a certain uplink or downlink logical channel is configured and not running for that certain uplink or downlink logical channel. Also, the wireless device is configured to transmit, to a network node, the message on that certain uplink or downlink logical channel responsive to determining that the timer is configured and not running for that certain uplink or downlink logical channel.

According to one aspect, a wireless device comprises a determining module for determining whether a timer associated with deferring a transmission of a message on a certain uplink or downlink logical channel is configured and not running for that certain uplink or downlink logical channel. Further, the wireless device includes a transmitting module for transmitting, to a network node, the message on that certain uplink or downlink logical channel responsive to determining that the timer is configured and not running for that certain uplink or downlink logical channel.

According to one aspect, a computer program comprises instructions which, when executed on at least one processor of a wireless device, cause the at least one processor to determine whether a timer associated with deferring a transmission of a message on a certain uplink or downlink logical channel is configured and not running for that certain uplink or downlink logical channel. Also, the instructions cause the at least one processor to transmit, to a network node, the message on that certain uplink or downlink logical channel responsive to determining that the timer is configured and not running for that certain uplink or downlink logical channel. In addition, a carrier may contain the computer program with the carrier being one of an electronic signal, optical signal, radio signal, or computer readable storage medium.

According to one aspect, a UE is prohibited from transmitting a second MAC CE a time T after the UE transmitted a first MAC CE, if the first and second MAC CE are (at least partial) considered to be copies of each other.

According to one aspect, a UE does not transmit copies of the same MAC CE too frequently, while at the same time the UE is operable to transmit a MAC CE two (or more) times during a short period of time if the purpose and/or content of the MAC CE is different.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

This disclosure includes describing systems and methods for deferring a transmission of a message. In one example, a wireless device (e.g., UE) is prohibited from transmitting a second message (e.g., second MAC CE) up to a time (T) after the wireless device transmitted a first message (e.g., first MAC CE), if the first message is at least a partial copy of the second message. In another example, a wireless device defers the transmission of the first message for at least a certain time period following the transmission of the second message that is at least a partial copy of the first message. In yet another example, a wireless device transmits a message on a certain uplink or downlink logical channel responsive to determining that a timer associated with deferring a transmission of the message on that certain uplink or downlink logical channel is configured and not running for a transmission on that certain uplink or downlink logical channel. Advantages of the embodiments described herein include ensuring that a wireless device (e.g., UE) does not transmit copies of the same message (e.g., MAC CE) too frequently while allowing the wireless device to transmit multiple messages during a short time period if the purpose or content of these messages are different.

Figure 1:
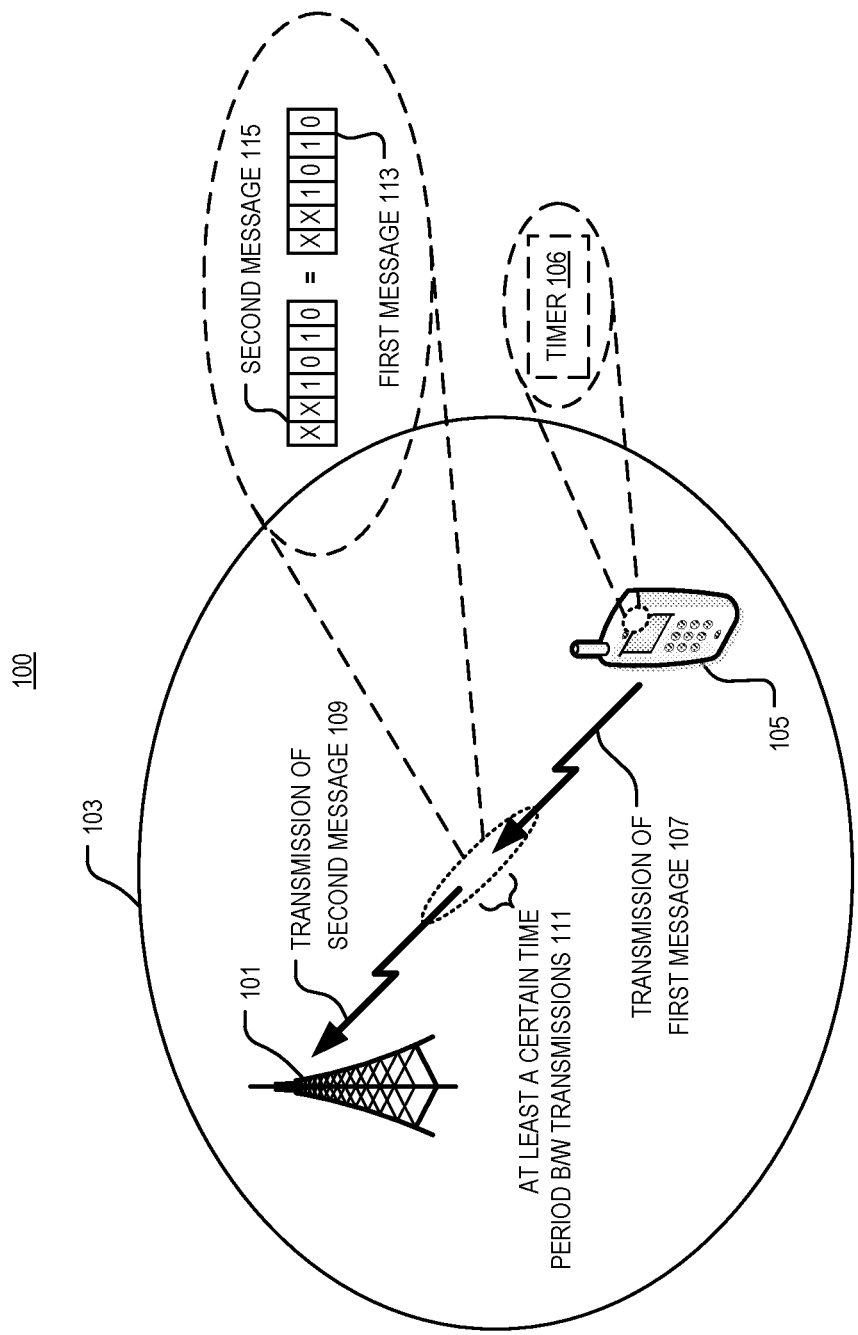
FIG. 1 illustrates one embodiment of a system for deferring a transmission of a message in accordance with various aspects as described herein.

FIG. 1 illustrates one embodiment of a system 100 for deferring a transmission of a message in accordance with various aspects as described herein. In FIG. 1, a wireless device 105 (e.g., UE) may transmit a message 115 (indicated as a second message in FIG. 1) to a network node 101 (e.g., base station) having a coverage area 103. The transmission of the second message (e.g., MAC CE, PDCP control PDU, or the like) is referenced by 109. The wireless device 105 may then determine that it has another message 113 (indicated as a first message in FIG. 1) to transmit to the network node 101. Before transmitting the first message 113 (e.g., MAC CE, PDCP control PDU, or the like), the wireless device 105 may determine whether the first message 113 is at least a partial copy of the second message 115. In one example, a partial copy may refer to at least one field of the first message 113 having the same value as a corresponding field in the second message 115. In another example, a partial copy may refer to each of a combination of fields of the first message 113 having the same value as the corresponding fields in the second message 115. If the first message 113 is at least a partial copy of the second message 115, then the wireless device 105 may defer transmitting the first message 113 for at least a certain time period 111 following the transmission of the second message 115. By deferring transmission of at least a partially redundant message, the wireless device 105 may reduce the signaling load on the network node 101 as well as the processing time and resources of the network node 101 used to receive and process such message. Further, the wireless device 105 may reduce its own processing time and resources by not having to process and transmit at least partially redundant information too often, resulting in reduced power consumption and longer battery life.

Furthermore, the wireless device 105 may determine not to transmit the first message 113 due, for instance, to a change in a condition of the wireless device 105 (e.g., handoff, call re-establishment, sleep mode, battery level, or the like) or determining that the first message 113 is no longer applicable (e.g., change in received signal strength, power level, power headroom, timing advance, or the like). As previously mentioned, during or after the certain time period 111, the wireless device 105 may determine whether to transmit or not transmit the first message 113. If the wireless device 105 determines to transmit the first message 113, then the wireless device 105 may transmit the first message to the network node 101 after the certain time period 111, which is referenced by 107.

In another embodiment, the wireless device 105 may transmit the second message 115 to the network node 101, as referenced by 109. In response to transmitting the second message 115, the wireless device 105 may configure a timer 106 to indicate an expiration after a certain period of time 111. Further, the wireless device 105 may determine that the first message 113 is to be transmitted. Before transmitting the first message 113, the wireless device 105 may determine whether the first message 113 is at least a partial copy of the second message 115. If so, the wireless device 105 may defer transmission of the first message 113 for at least the certain time period 111 following the transmission of the second message 115. During the certain time period 111 or after, the wireless device 105 may determine whether to transmit or not transmit the first message 113. If the first message 113 is to be transmitted and the timer 106 indicates that the certain period has expired, then the wireless device 105 may transmit the first message 113 to the network node 101.

In another embodiment, the wireless device 105 determines whether the timer 106 associated with deferring the transmission 107 of the first message 113 on a certain uplink or downlink logical channel is configured and not running for that certain uplink or downlink logical channel. The wireless device 105 may determine whether radio resources are allocated or not allocated for that transmission 107. Further, the wireless device 105 may determine whether the allocated radio resources for that transmission 107 can accommodate or not accommodate the message. In response to at least one of (i) determining that the timer 106 is configured and not running for that certain uplink/downlink logical channel, (ii) determining that the radio resources are allocated for that transmission 107, and (iii) determining that the allocated radio resources for that transmission 107 can accommodate the message 113, the wireless device 105 may generate the first message 113 or may run the timer 106. And in further response, the wireless device 105 transmits, to the network node 101, the message 113 on that certain uplink/downlink logical channel.

The network node 101 may be configured to support a wireless communication system (e.g., LTE, LTE-NR, UMTS, GSM, or the like). Further, the network node 101 may be a base station (e.g., eNB), an access point, a wireless router, or the like. The network node 101 may serve wireless devices such as wireless device 105. The wireless device 105 may be a UE, a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 2:
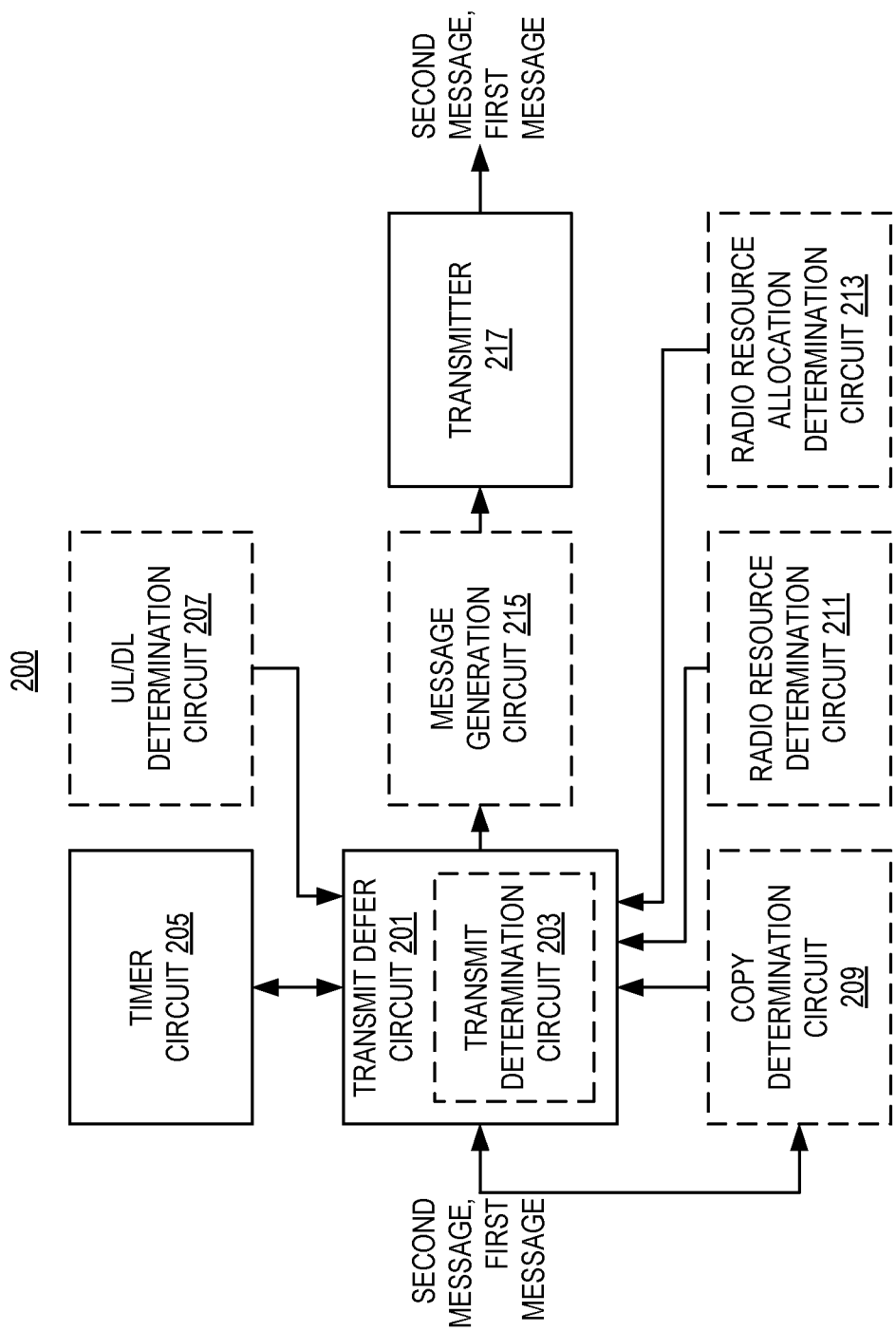
FIG. 2 illustrates one embodiment of a wireless device for deferring a transmission of a message in accordance with various aspects as described herein.

FIG. 2 illustrates one embodiment of a wireless device 200 for deferring a transmission of a message in accordance with various aspects as described herein. In FIG. 2, the wireless device 200 may include a transmit defer circuit 201, a timer circuit 205, an uplink/downlink determination circuit 207, a copy determination circuit 209, a radio resource determination circuit 211, a radio resource allocation determination circuit 213, a message generation circuit 215, a transmitter circuit 217, the like, or any combination thereof. Further, the transmit defer circuit 201 may include a transmit determination circuit 203. In one embodiment, the transmitter circuit 217 may be configured to transmit a second message. Further, the copy determination circuit 209 may be configured to determine whether the first message is at least a partial copy of the second message. The uplink/downlink determination circuit 207 may be configured to determine whether the first and second messages are either both associated with uplink transmissions or both associated with downlink transmissions. The transmit defer circuit 201 is configured to defer transmission of the first message for at least the certain time period following transmission of the second message that is at least a partial copy of the first message. Also, the transmit determination circuit 203 may be configured to determine whether to transmit or not transmit the first message. Finally, the transmitter circuit 217 is configured to transmit the first message after the certain time period following the transmission of the second message.

In another embodiment, the transmitter circuit 217 may be configured to transmit the second message. Further, the transmitter circuit 217 is configured to transmit the first message after the certain time period following the transmission of the second message. Further, the timer circuit 205 may be configured to run a timer to indicate an expiration after the certain time period responsive to transmitting the second message. The copy determination circuit 209 may be configured to determine whether the first message is at least a partial copy of the second message. The transmit defer circuit 201 is configured to defer transmission of the first message for at least the certain time period following the transmission of the second message that is at least a partial copy of the first message. Also, the transmit determination circuit 203 may be configured to determine whether to transmit or not transmit the first message.

In another embodiment, the timer circuit 205 is configured to determine whether the timer associated with deferring the transmission of the message on the certain uplink/downlink logical channel is configured and not running for that certain uplink/downlink logical channel. The radio resource determination circuit 211 may be configured to determine whether radio resources are allocated or not allocated for a transmission on that certain uplink or downlink logical channel. Further, the radio resource allocation determination circuit 213 may be configured to determine whether the allocated radio resources for a transmission on that certain uplink or downlink logical channel can accommodate or not accommodate the message. The message generation circuit 215 may be configured to generate the message responsive to determining that the timer of the timer circuit 205 is configured and not running for that certain uplink/downlink logical channel. The timer circuit 205 may be further configured to run its timer responsive to determining that the timer is configured and not running for that certain uplink/downlink logical channel. The transmit determination circuit 203 may be configured to determine not to transmit the message responsive to determining that the timer is configured and running for that certain uplink/downlink logical channel. In addition, the transmitter circuit 217 is configured to transmit the message on that certain uplink/downlink logical channel responsive to determining that the timer is configured and not running for that certain uplink/downlink logical channel.

Figure 3A:
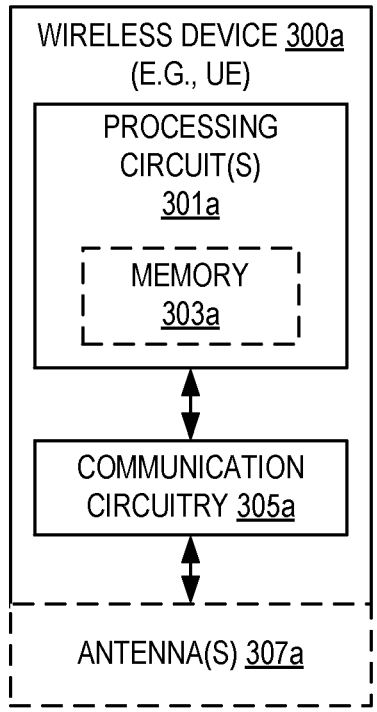
FIGS. 3A-B illustrate embodiments of a wireless device in accordance with various aspects as described herein.
Figure 3B:
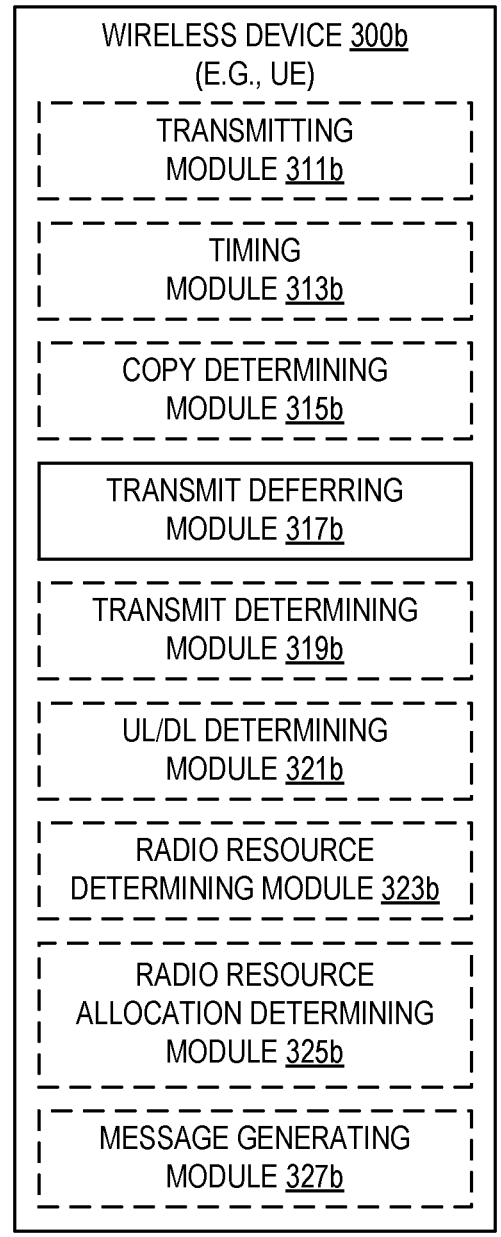

FIGS. 3A-B illustrate embodiments of a wireless device 300a-b in accordance with various aspects as described herein. In FIG. 3A, the wireless device 300a includes processing circuitry 301a and communication circuitry 305a. The communication circuitry 305a (e.g., radio circuitry) is configured to transmit or receive information to or from one or more other nodes (e.g., via any communication technology). Such communication may occur via one or more antennas 307a that are either internal or external to the wireless device 300a. The processing circuitry 301a is configured to perform processing described above, such as by executing instructions stored in memory 303a. The processing circuitry 301a in this regard may implement certain functional means, units, or modules.

In FIG. 3B, the wireless device 300b implements various functional means, units, or modules (e.g., via the processing circuitry 301a in FIG. 3A and/or via software code). In one embodiment, these functional means, units, or modules (e.g., for implementing the methods described herein) may include for instance: a transmitting unit 311b for transmitting a second message or transmitting a first message after a certain time period following the transmission of the second message, a copy determining unit 315b for determining whether a first message is at least a partial copy of the second message, an uplink/downlink determining unit 321b for determining whether the first and second messages are either both associated with uplink transmissions or both associated with downlink transmissions, a transmit deferring unit 317b for deferring transmission of the first message for at least the certain time period following transmission of the second message that is at least a partial copy of the first message, and a transmit determining unit 319b for determining whether to transmit or not transmit the first message.

In another embodiment, these functional means, units, or modules may include for instance: the transmitting unit 311b for transmitting a second message or transmitting a first message after a certain time period following the transmission of the second message, a timing module 313b for running a timer to indicate an expiration after a certain time period responsive to transmitting the second message, the copy determining unit 315b for determining whether a first message is at least a partial copy of the second message, the transmit deferring unit 317b for deferring transmission of the first message for at least the certain time period following the transmission of the second message that is at least a partial copy of the first message, and the transmit determining unit 319b for determining whether to transmit or not transmit the first message.

In another embodiment, these functional means, units, or modules may include for instance: the timing unit 313b for determining whether a timer associated with deferring a transmission of a message on a certain uplink or downlink logical channel is configured and not running for that certain uplink or downlink logical channel, a radio resource determining unit 323b for determining whether radio resources are allocated or not allocated for a transmission on that certain uplink or downlink logical channel, a radio resource allocation determining unit 325b for determining whether the allocated radio resources for a transmission on that certain uplink or downlink logical channel can accommodate or not accommodate the message, a message generating unit 327b for generating the message responsive to determining that the timer is configured and not running for that certain uplink or downlink logical channel, the transmit determining unit 319b for determining not to transmit the message responsive to determining that the timer is configured and running for that certain uplink/downlink logical channel, and the transmitting unit 311b for transmitting the message on that certain uplink/downlink logical channel responsive to determining that the timer is configured and not running for that certain uplink/downlink logical channel.

Figure 4:
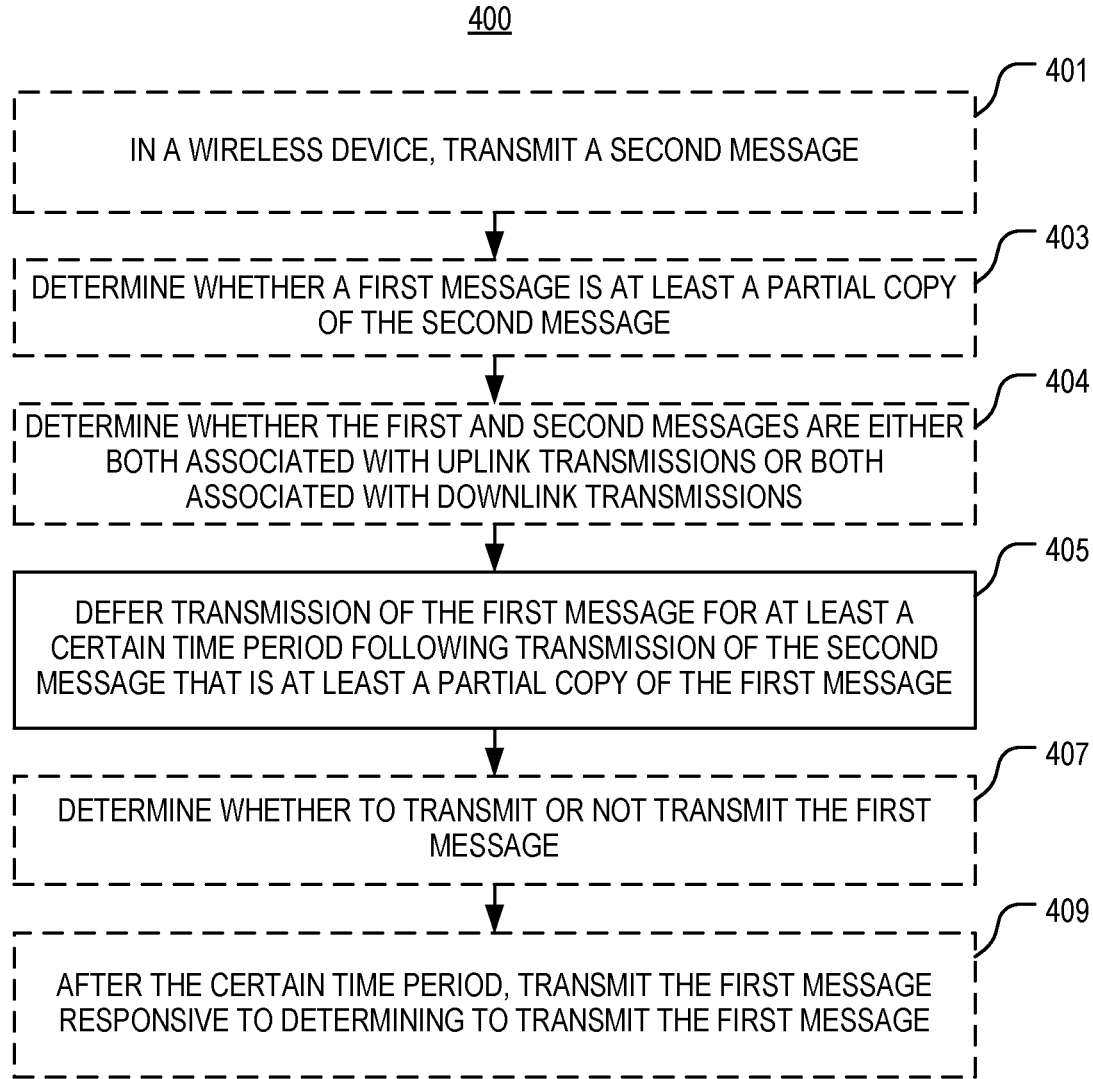
FIG. 4 illustrates one embodiment of a method performed by a wireless device for deferring a transmission of a message in accordance with various aspects as described herein.

FIG. 4 illustrates one embodiment of a method 400 performed by a wireless device for deferring a transmission of a message in accordance with various aspects as described herein. In FIG. 4, the method 400 may start, for instance, at block 401 where it may include transmitting a second message. At block 403, the method 400 may include determining whether a first message is at least a partial copy of the second message. The method 400 may further include determining whether the first and second messages are either both associated with uplink transmissions or both associated with downlink transmissions, as represented by block 404. In response to determining that the first message is at least a partial copy of the second message, the method 400 includes deferring transmission of the first message for at least a certain time period following transmission of the second message, as represented by block 405. At block 407, the method 400 may include determining whether to transmit or not transmit the first message. After the certain time period, the method 500 may include transmitting the first message, as represented by block 409.

Figure 5:
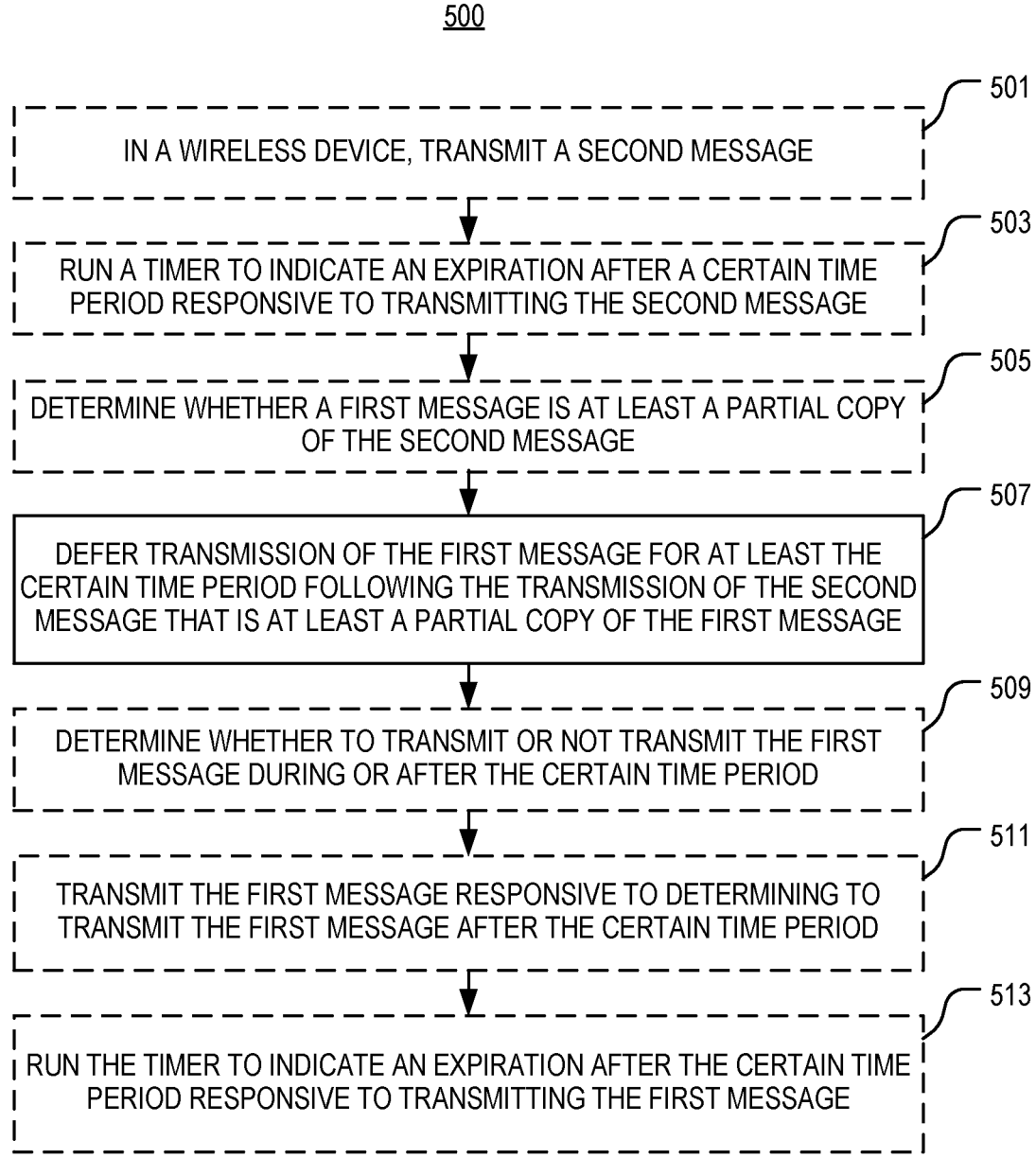
FIG. 5 illustrates another embodiment of a method performed by a wireless device for deferring a transmission of a message in accordance with various aspects as described herein.

FIG. 5 illustrates another embodiment of a method 500 performed by a wireless device of deferring a transmission of a message in accordance with various aspects as described herein. In FIG. 5, the method 500 may start, for instance, at block 501 where it may include transmitting a second message. At block 503, the method 500 may include running a timer to indicate an expiration after a certain time period responsive to transmitting the second message. The method 500 may further include determining whether a first message is at least a partial copy of the second message, as represented by block 505. In response to determining that the first message is at least a partial copy of the second message, the method 500 includes deferring transmission of the first message for at least the certain time period following transmission of the second message that is at least a partial copy of the first message, as represented by block 507. At block 509, the method 500 may include determining whether to transmit or not transmit the first message during or after the certain time period. In response to determining to transmit the first message after the certain time period and determining that the timer indicates that the certain time period has expired, the method 500 may include transmitting the first message, as represented by block 511. In response to transmitting the first message, the method 500 may include running the timer to indicate an expiration after the certain time period, as represented by block 513.

Figure 6:
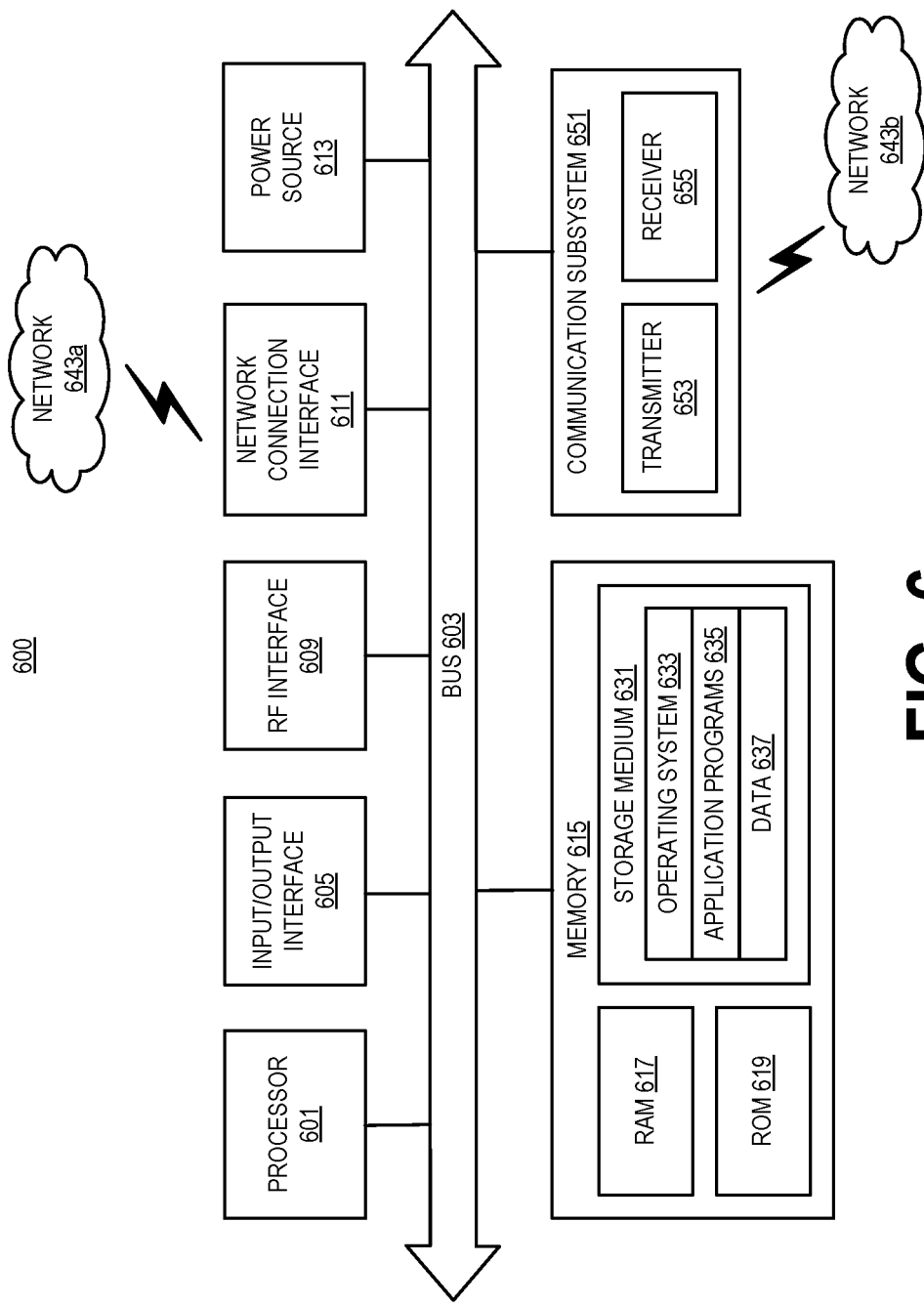
FIG. 6 illustrates another embodiment of a wireless device in accordance with various aspects as described herein.

FIG. 6 illustrates another embodiment of a wireless device in accordance with various aspects as described herein. In some instances, the wireless device 600 may be referred as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 600 may be a set of hardware components. In FIG. 6, the wireless device 600 may be configured to include a processor 601 that is operatively coupled to an input/output interface 605, a radio frequency (RF) interface 609, a network connection interface 611, a memory 615 including a random access memory (RAM) 617, a read only memory (ROM) 619, a storage medium 631 or the like, a communication subsystem 651, a power source 633, another component, or any combination thereof. The storage medium 631 may include an operating system 633, an application program 635, data 637, or the like. Specific devices may utilize all of the components shown in FIG. 6, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 6, the processor 601 may be configured to process computer instructions and data. The processor 601 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 601 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 605 may be configured to provide a communication interface to an input device, output device, or input and output device. The wireless device 600 may be configured to use an output device via the input/output interface 605. A person of ordinary skill will recognize that an output device may use the same type of interface port as an input device. For example, a USB port may be used to provide input to and output from the wireless device 600. The output device may be a speaker, a sound card, a video card, a display, a monitor, a printer, an actuator, an emitter, a smartcard, another output device, or any combination thereof. The wireless device 600 may be configured to use an input device via the input/output interface 605 to allow a user to capture information into the wireless device 600. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, the RF interface 609 may be configured to provide a communication interface to RF components such as a transmitter, a receiver, and an antenna. The network connection interface 611 may be configured to provide a communication interface to a network 643a. The network 643a may encompass wired and wireless communication networks such as a local-area network (LAN), a wide-area network (WAN), a computer network, a wireless network, a telecommunications network, another like network or any combination thereof. For example, the network 643a may be a Wi-Fi network. The network connection interface 611 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 611 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 617 may be configured to interface via the bus 603 to the processor 601 to provide storage or caching of data or computer instructions during the execution of software programs such as the operating system, application programs, and device drivers. In one example, the wireless device 600 may include at least one hundred and twenty-eight megabytes (128 Mbytes) of RAM. The ROM 619 may be configured to provide computer instructions or data to the processor 601. For example, the ROM 619 may be configured to be invariant low-level system code or data for basic system functions such as basic input and output (I/O), startup, or reception of keystrokes from a keyboard that are stored in a non-volatile memory. The storage medium 631 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 631 may be configured to include an operating system 633, an application program 635 such as a web browser application, a widget or gadget engine or another application, and a data file 637.

In FIG. 6, the processor 601 may be configured to communicate with a network 643b using the communication subsystem 651. The network 643a and the network 643b may be the same network or networks or different network or networks. The communication subsystem 651 may be configured to include one or more transceivers used to communicate with the network 643b. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, UTRAN, WiMax, or the like.

In another example, the communication subsystem 651 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, UTRAN, WiMax, or the like. Each transceiver may include a transmitter 653 or a receiver 655 to implement transmitter or receiver functionality, respectively, appropriate to the RAN links (e.g., frequency allocations and the like). Further, the transmitter 653 and the receiver 655 of each transceiver may share circuit components, software or firmware, or alternatively may be implemented separately.

In the current embodiment, the communication functions of the communication subsystem 651 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 651 may include cellular communication, Wi-Fi communication, Bluetooth communication, and GPS communication. The network 643b may encompass wired and wireless communication networks such as a local-area network (LAN), a wide-area network (WAN), a computer network, a wireless network, a telecommunications network, another like network or any combination thereof. For example, the network 643b may be a cellular network, a Wi-Fi network, and a near-field network. The power source 613 may be configured to provide an alternating current (AC) or direct current (DC) power to components of the wireless device 600.

In FIG. 6, the storage medium 631 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 631 may allow the wireless device 600 to access computer-executable instructions, application programs or the like, stored on transitory or non-transitory memory media, to off-load data, or to upload data. An article of manufacture, such as one utilizing a communication system may be tangibly embodied in storage medium 631, which may comprise a computer-readable medium.

The functionality of the methods described herein may be implemented in one of the components of the wireless device 600 or partitioned across multiple components of the wireless device 600. Further, the functionality of the methods described herein may be implemented in any combination of hardware, software, or firmware. In one example, the communication subsystem 651 may be configured to include any of the components described herein. Further, the processor 601 may be configured to communicate with any of such components over the bus 603. In another example, any of such components may be represented by program instructions stored in memory that when executed by the processor 601 performs the corresponding functions described herein. In another example, the functionality of any of such components may be partitioned between the processor 601 and the communication subsystem 651. In another example, the non-computative-intensive functions of any of such components may be implemented in software or firmware and the computative-intensive functions may be implemented in hardware.

Additional Description:

The UE is prohibited from transmitting a second MAC CE a time T after the UE transmitted a first MAC CE, if the first and second MAC CE are (at least partial) considered to be copies of each other.

This disclosure describes, among other things, that the UE does not transmit copies of the same MAC CE too frequently, while at the same time allow the UE to transmit a MAC CE two (or more) times during a short period of time if the purpose and/or content of the MAC CE is different.

In some scenarios, such as when the UE transmits MAC CEs to query the eNB regarding the recommended bit rate, it is desired that the UE is allowed to transmit the same message several times even during a short period of time. This may be desired, for instance, if the UE requests the recommended bit rate for uplink transmissions on logical channel X and requests the recommended bit rate for downlink on logical channel Y, with both requests occurring contemporaneously or over a short time period. The UE is allowed to do so shortly after each other (or potentially even at the same time). On the other hand, it may not be desired that the UE requests the recommended bit rate for downlink on logical channel Y too often.

It will herein be described how a UE will apply a prohibit timer with a duration (T) for a MAC CE used to query the eNB of a recommended bit rate. While the timer is running, the UE is prohibited from transmitting the MAC CE. This timer is started or restarted upon transmission of the MAC CE and; hence, ensures that the UE does not transmit the MAC CE more frequently than every time T.

However, it should be appreciated that the MAC CE for querying the eNB of the recommended bit rate is just an example type of MAC CE, and this disclosure could be applied to other MAC CEs.

It should be appreciated that the first and second MAC CEs may be instances of the same MAC CE type.

Suppressing copies of MAC CEs:

In a first embodiment, the UE will suppress/delay/block (or in other way not perform) a transmission of a second MAC CE during a prohibit time period if a first MAC CE has been transmitted and the first and second MAC CE are considered to be (at least partial) copies of each other. However, if the second MAC CE is not considered to be a copy of the first MAC CE, then the UE may transmit the MAC CE.

A prohibit time period may be considered a time (T) after the first MAC CE was transmitted. This ensures that the UE does not transmit the second MAC CE too early after it has transmitted the first MAC CE. This could be implemented by the UE using a timer which is started upon transmission of the first MAC CE, and the UE determines whether the timer is running when deciding whether it is allowed to transmit the second MAC CE or not. The time (T) may be configurable by the network, preconfigured in the UE, provided in a standard specification, or the like.

Conditions for Considering MAC CEs (Partial) Copies:

In the above description, it has been described that the UE is not allowed to transmit copies or partial copies of a MAC CE. The following description provides examples of conditions for considering the MAC CEs to be (partial) copies of each other.

One possible condition for two MAC CEs to be (partial) copies is that at least one field is having the same value in the first and second MAC CE. For example, if two MAC CEs both indicate with a field that the UE queries the eNB to provide the recommended bit rate for uplink, then they may be considered to be copies of each other.

Another possible condition for two MAC CEs to be (partial) copies of each other is that a combination of fields are the same. For example, a field A and a field B are set to value X and value Y in both the first MAC CE and the second MAC CE.

Another possible condition for two MAC CEs to be (partial) copies of each other is that for a certain field of the MAC CEs, the value in the first MAC CE is less than a threshold different than the second MAC CE. This is beneficial to ensure that the UE does not transmit two MAC CEs close in time after each other where a certain field is very similar. This may not be meaningful for the eNB to receive and hence prohibiting the UE from sending this can save system capacity since the resources can be used for something else (which may be more meaningful), reduce interference since less signals are transmitted, or the like.

In addition, any combination of the above conditions is possible. These combinations may be combined with or-logic ensuring that two MAC CEs are considered (partial) copies if either a first condition or a second condition is fulfilled (e.g., that one field is the same in two MAC CEs, or that the value of a field is less than a threshold apart between the two MAC CEs). And-logic would also be possible where two MAC CEs would be considered (partial) copies if one field is the same in two MAC CEs, and that the value of a field is less than a threshold apart between the two MAC CEs.

Figure 7:
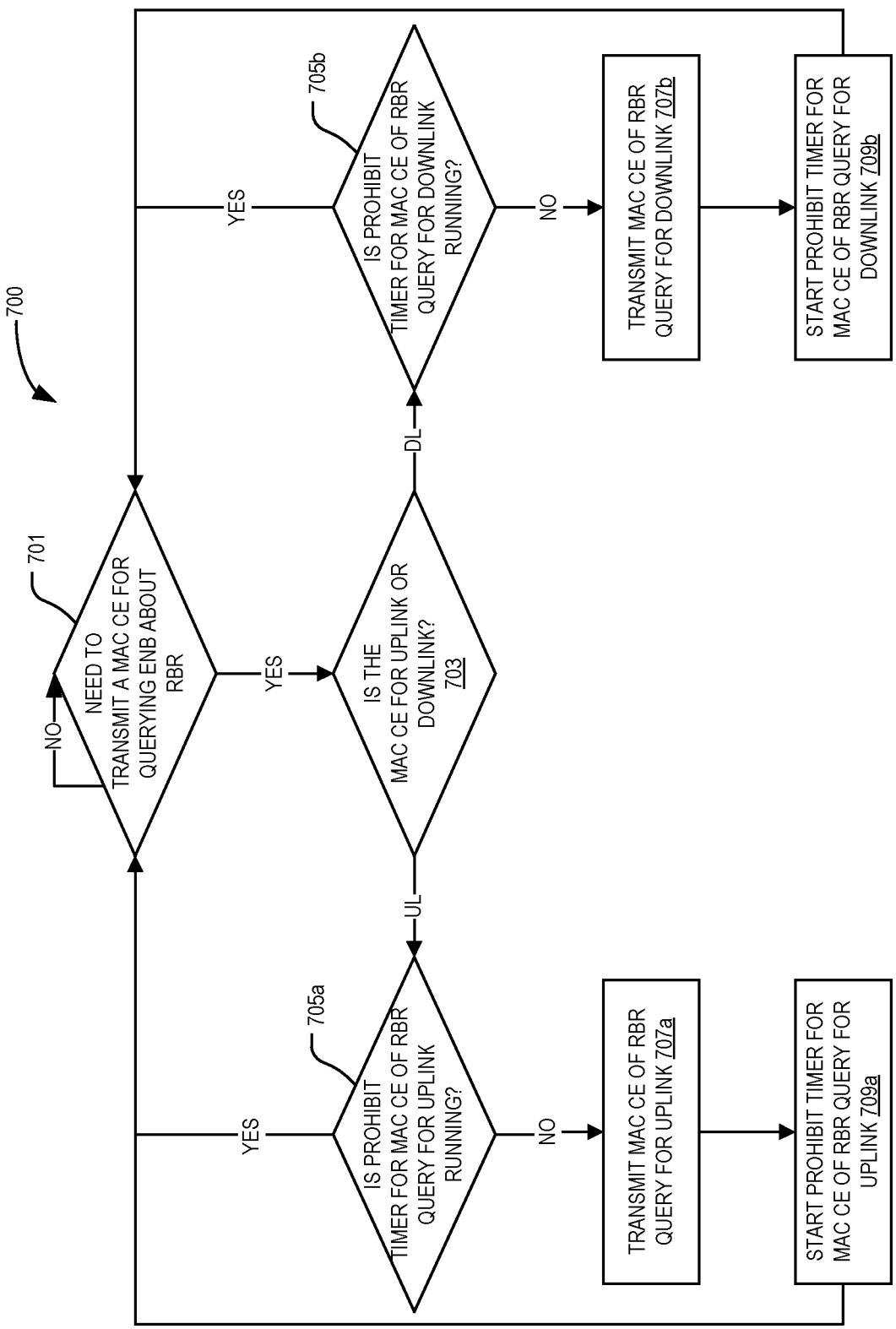
FIG. 7 illustrates another embodiment of a method performed by a wireless device for deferring a transmission of a message in accordance with various aspects as described herein.

FIG. 7 illustrates another embodiment of a method performed by a wireless device of deferring a transmission of a message in accordance with various aspects as described herein.. In FIG. 7, the UE determines whether a MAC CE is used to query the eNB about a recommended bit rate (RBR). The UE would with this behavior start different timers when it transmits such a MAC CE and which timer the UE starts depends on whether the MAC CE was for uplink or for downlink. When the UE intends to transmit such MAC CE for either uplink or downlink, the UE would first ensure that the associated timer is not running. If the timer is running, the UE does not transmit the MAC CE. However, if the timer is not running, the UE transmits the MAC CE and then starts the timer.

In FIG. 7, the UE would consider two MAC CEs which both are for requesting the RBR to be copies of each other if they are both for uplink, or if they are both for downlink, otherwise they are not considered copies of each other. For instance, the UE determines whether it needs to transmit a MAC CE for querying the eNB about the recommended bitrate (RBR) on the uplink or downlink, as referenced by block 701. If so, then the UE determines whether the MAC CE is for uplink or downlink, as referenced by block 703. The UE then determines whether a prohibit timer associated with the MAC CE of the RBR query for the respective uplink or downlink is running, as referenced by respective blocks 705a,b. If not, then the UE transmits the MAC CE of the RBR query for the respective uplink or downlink, as referenced by respective blocks 707a,b. Further, the UE starts a prohibit timer for the MAC CE of the RBR query for the respective uplink or downlink, as referenced by respective block 709a,b.

Figure 8:
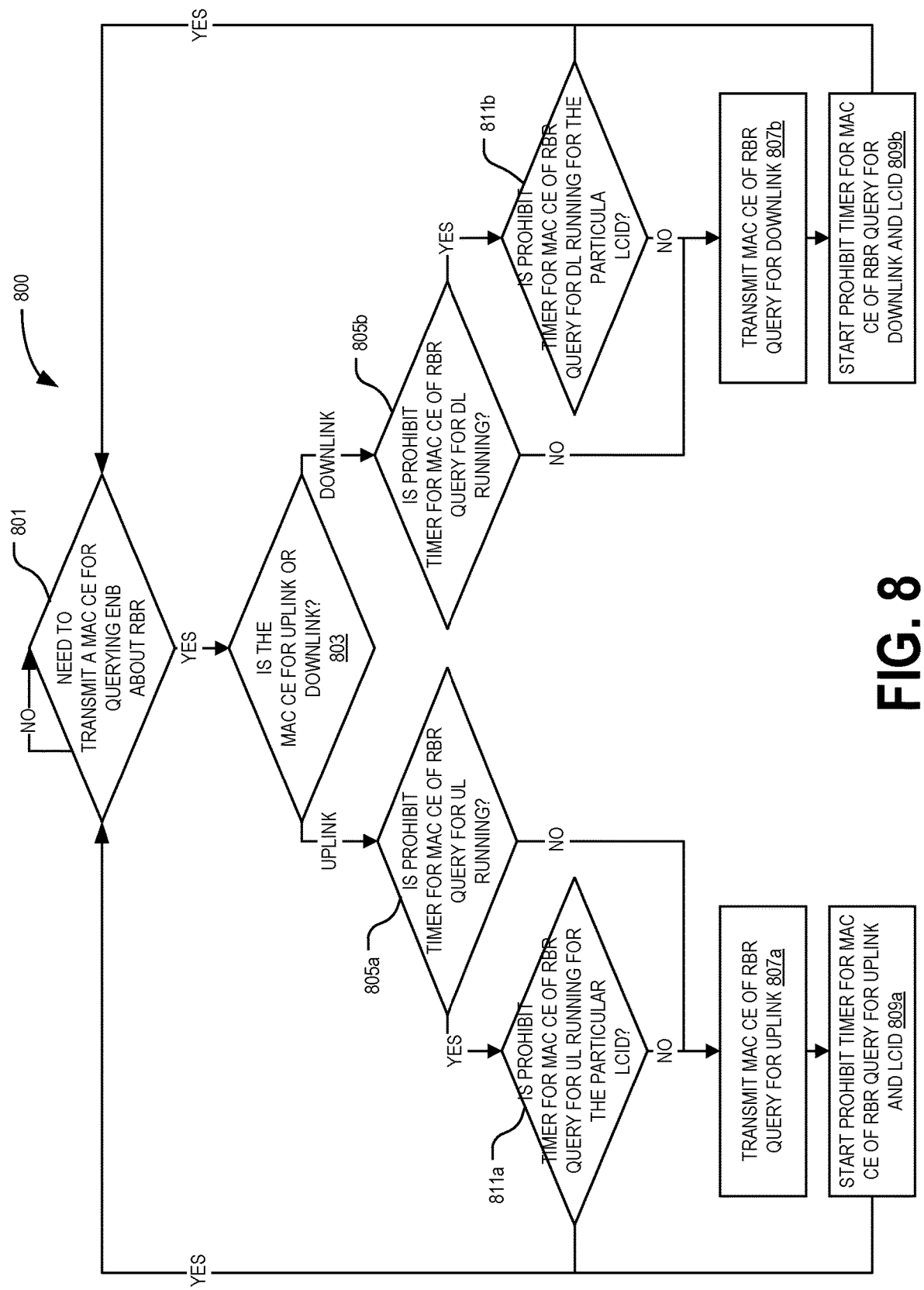
FIG. 8 illustrates another embodiment of a method performed by a wireless device for deferring a transmission of a message in accordance with various aspects as described herein.

In FIG. 8, separate timers may be used for both the direction and the logical channel. In FIG. 8, a separate timer would be started if the query is for a new direction (UL or DL) and logical channel (LCID). The UE would consider two MAC CEs which both are for requesting the RBR to be copies of each other if they are both for uplink, or if they are both for downlink, and they are for the same logical channel, otherwise they are not considered copies of each other. For instance, the UE determines whether it needs to transmit a MAC CE for querying the eNB about the recommended bitrate (RBR) on the uplink or downlink, as referenced by block 801. If so, then the UE determines whether the MAC CE is for uplink or downlink, as referenced by block 803. The UE then determines whether a prohibit timer associated with the MAC CE of the RBR query for the respective uplink or downlink is running, as referenced by respective blocks 805a,b. If so, then the UE determines whether the prohibit timer for the MAC CE of the RBR query for the respective uplink or downlink is running for a particular LCID, as referenced by respective block 811a,b. If not, then the UE transmits the MAC CE of the RBR query for the respective uplink or downlink, as referenced by respective blocks 807a,b. Further, the UE starts a prohibit timer for the MAC CE of the RBR query for the respective uplink or downlink, and the LCID, as referenced by respective block 809a,b.

Figure 9:
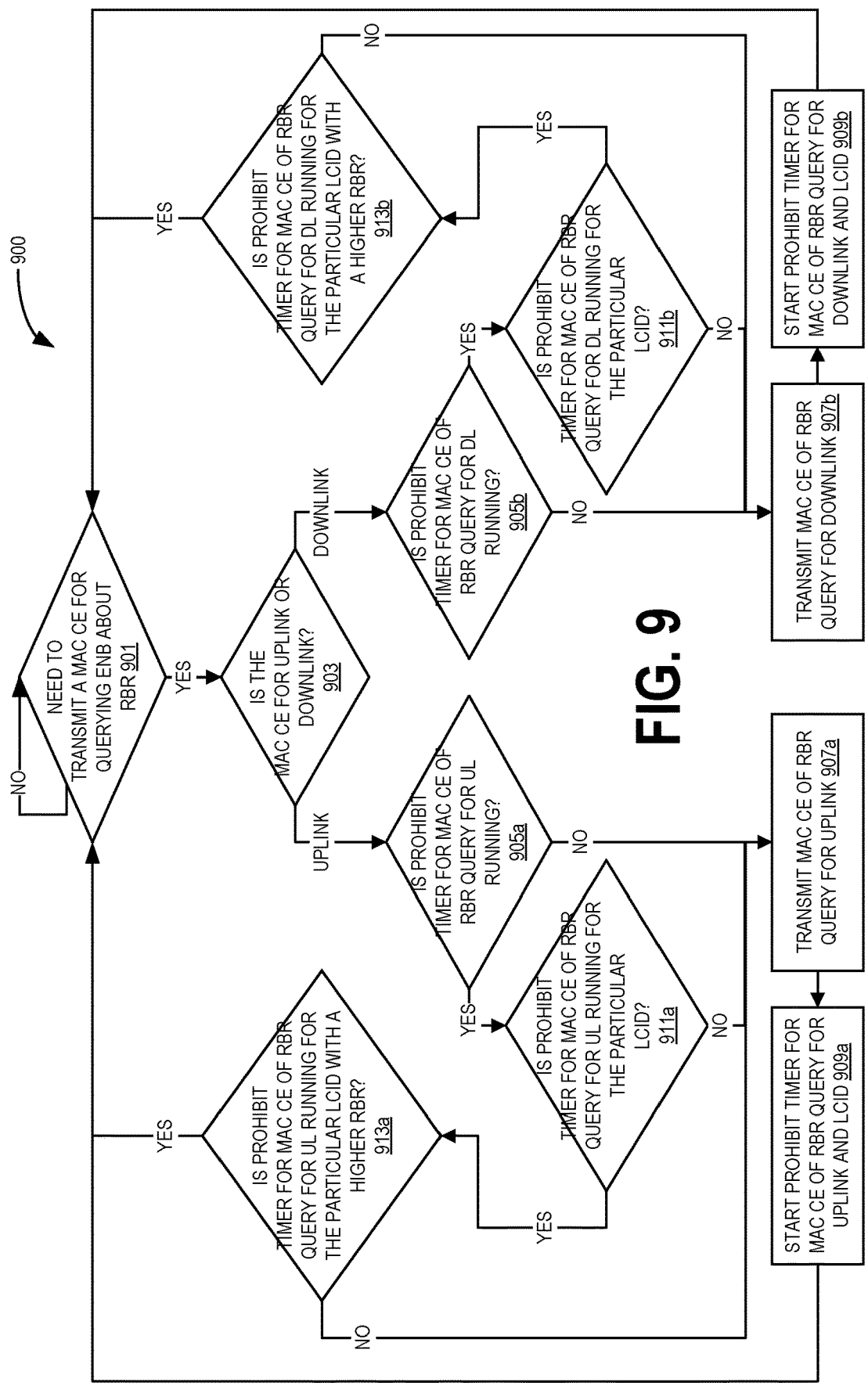
FIG. 9 illustrates another embodiment of a method performed by a wireless device for deferring a transmission of a message in accordance with various aspects as described herein.

Separate timers may also be used for the direction, the logical channel, and constraints on the rate as outlined in FIG. 9. In FIG. 9, a separate timer would be started if the query is for a new direction (UL or DL), a new logical channel (LCID), and a rate is different from a given condition (in this case a higher bit rate). The UE would consider two MAC CEs which both are for requesting the RBR to be copies of each other if they are both for uplink, or if they are both for downlink, they are for the same logical channel, and the rate is not fulfilling the condition. Otherwise, they are not considered copies of each other. In FIG. 9, the condition that the rate was higher was used, but other conditions may also be used (e.g., the rate is lower than the current RBR or the rate is lower than the current RBR by a certain amount). For instance, the UE determines whether it needs to transmit a MAC CE for querying the eNB about the recommended bitrate (RBR) on the uplink or downlink, as referenced by block 901. If so, then the UE determines whether the MAC CE is for uplink or downlink, as referenced by block 903. The UE then determines whether a prohibit timer associated with the MAC CE of the RBR query for the respective uplink or downlink is running, as referenced by respective blocks 905a,b. If so, then the UE determines whether the prohibit timer for the MAC CE of the RBR query for the respective uplink or downlink is running for a particular LCID, as referenced by respective block 911a,b. If so, then the UE determines whether the prohibit timer for the MAC CE of the RBR query for the respective uplink or downlink running for the particular LCID has a higher RBR than that of the previously transmitted MAC CE of the RBR query having the same LCID. If not, then the UE transmits the MAC CE of the RBR query for the respective uplink or downlink, as referenced by respective blocks 907a,b. Further, the UE starts a prohibit timer for the MAC CE of the RBR query for the respective uplink or downlink, and the LCID, as referenced by respective block 909a,b.

In another embodiment, a bitRateQueryProhibitTimer may be configured to control the query of bit rates. The UE is allowed to send a query message to the eNB only if bitRateQuetyProhibitTimer is configured and not running for the specific logical channel and uplink/downlink direction. A separate bitRateQuetyProhibitTimer is started for each bit rate recommendation query message from the UE to the eNB for a specific logical channel and uplink/downlink direction.

Figure 10:
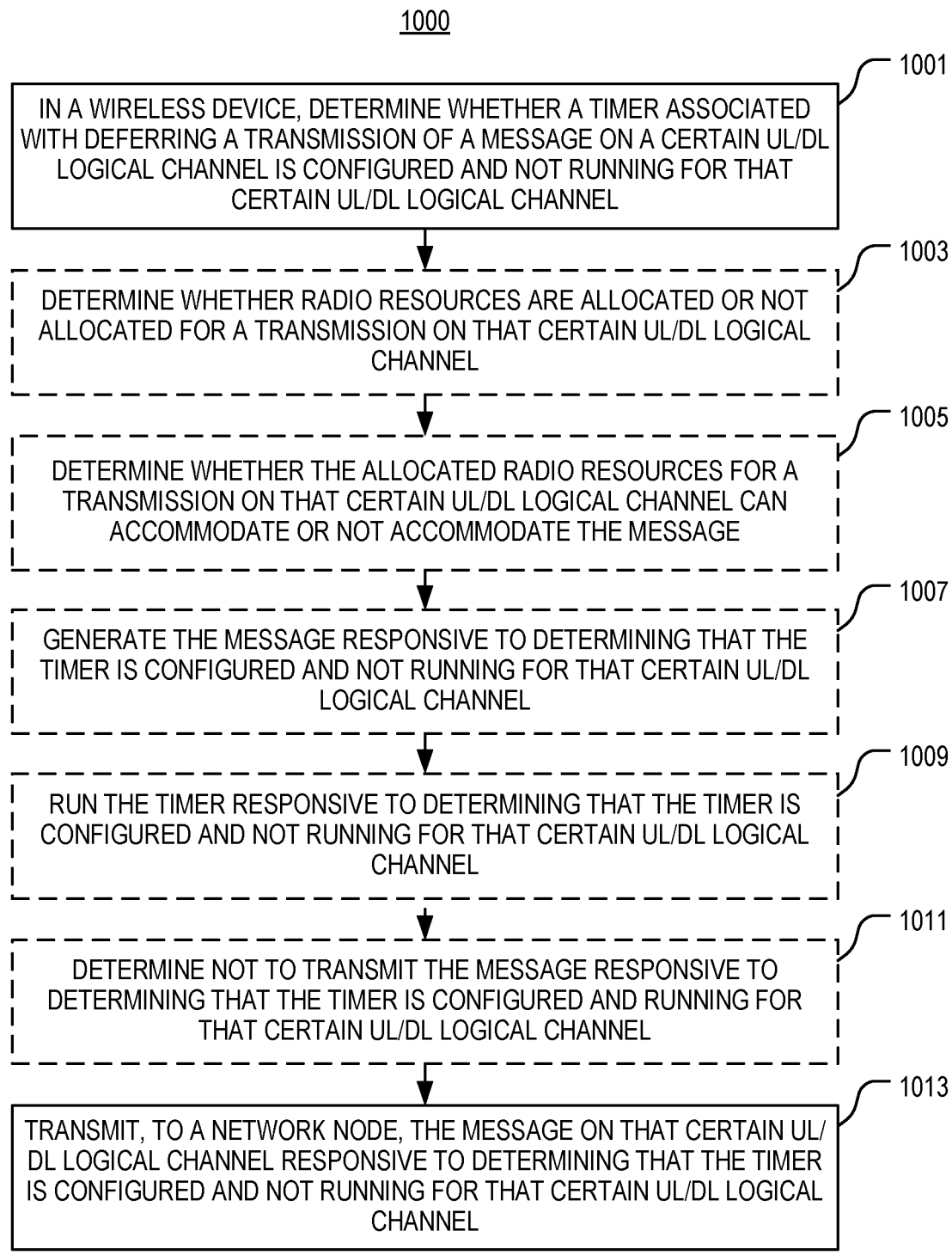
FIG. 10 illustrates another embodiment of a method performed by a wireless device for deferring a transmission of a message in accordance with various aspects as described herein.
Figure 11:
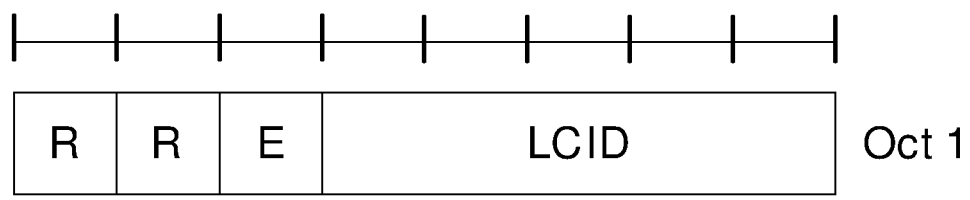
FIG. 11 illustrates a MAC PDU sub-header for fixed sized MAC CEs.
Figure 12:
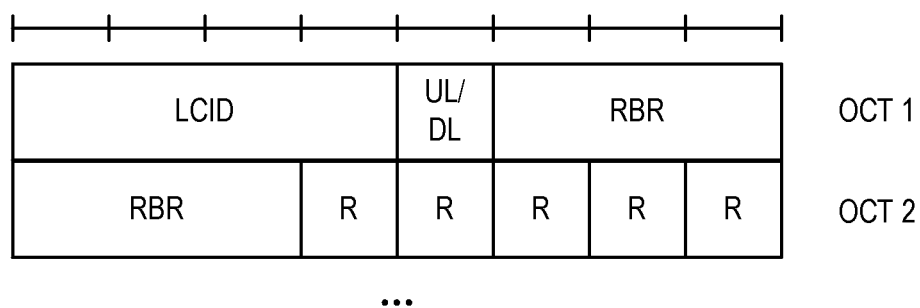
FIG. 12 illustrates a MAC CE for a UE query on a recommended bit rate.
Figure 13:
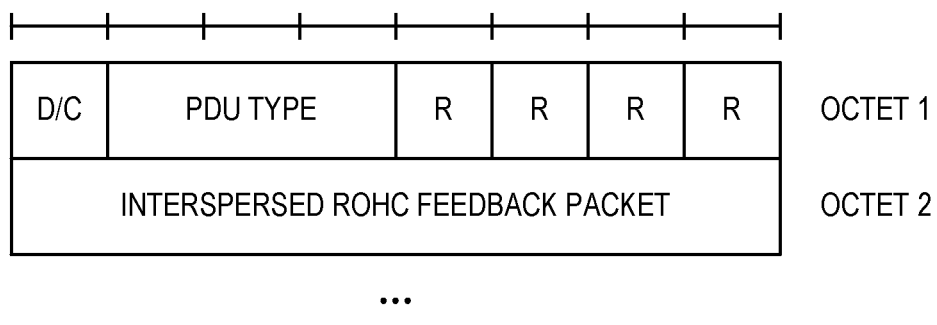
FIG. 13 illustrates a ROHC feedback control PDU.

FIG. 10 illustrates another embodiment of a method 1000 performed by a wireless device for deferring a transmission of a message in accordance with various aspects as described herein. In FIG. 10, the method 1000 may start, for instance, at block 1001 where it includes determining whether a timer associated with deferring a transmission of a message on a certain uplink or downlink logical channel is configured and not running for that certain uplink or downlink logical channel. At block 1003, the method 1000 may include determining whether radio resources are allocated or not allocated for a transmission on that certain uplink or downlink logical channel. Further, the method 1000 may include determining whether the allocated radio resources for a transmission on that certain uplink or downlink logical channel can accommodate or not accommodate the message, as represented by block 1005. At block 1007, the method 1000 may include generating the message responsive to determining that the timer is configured and not running for that certain uplink or downlink logical channel. At block 1009, the method 1000 may include running the timer responsive to determining that the timer is configured and not running for that certain uplink or downlink logical channel. At block 1011, the method 1000 may include determining not to transmit the message responsive to determining that the timer is configured and running for that certain uplink or downlink logical channel. At block 1013, the method 1000 includes transmitting, to the network node, the message on that certain uplink/downlink logical channel responsive to determining that the timer is configured and not running for that certain uplink or downlink logical channel.

ABBREVIATIONS:

| Abbreviation | Explanation |
| --- | --- |
| 3GPP | 3rd Generation Partnership Project |
| BS | Base Station |
| CE | Control Element |
| CP | Cyclic Prefix |
| CRC | Cyclic Redundancy Check |
| CRS | Cell Specific Reference Signal |
| CSI | Channel State Information |
| CSS | Common Search Space |
| DL | Downlink |
| eNB | Evolved Node B (i.e., base station) |
| E-UTRA | Evolved Universal Terrestrial Radio Access |
| E-UTRAN | Evolved Universal Terrestrial Radio Access Network |
| DFT | Discrete Fourier Transform |
| FDD | Frequency Division Duplex |
| IFFT | Inverse Fast Fourier Transform |
| IoT | Internet of Things |
| LTE | Long Term Evolution |
| MAC | Medium Access Control |
| MIMO | Multiple Input Multiple Output |
| MSR | Multi-Standard Radio |
| MTC | Machine-Type Communication |
| NB | Narrow-Band |
| NB-IoT | Narrow-Band Internet of Things |

| ABBREVIATIONS: | |
|---|---|
| Abbreviation | Explanation |
| NB-LTE | Narrow-Band LTE (e.g., 180 KHz bandwidth) |
| NB-PBCH | NB-IoT Physical Broadcast Channel |
| NB-PSS | NB-IoT Primary Synchronization Sequence |
| NB-SSS | NB-IoT Secondary Synchronization Sequence |
| OFDM | Orthogonal Frequency Division Modulation |
| OFDMA | Orthogonal Frequency Division Modulation Access |
| PA | Power Amplifier |
| PAPR | Peak-to-Average Power Ratio |
| PBCH | Physical Broadcast Channel |
| PDCCH | Physical Data Control Channel |
| PDCP | Packet Data Convergence Protocol (PDCP) |
| PDU | Protocol Data Unit |
| PRACH | Physical Random Access Channel |
| PRB | Physical Resource Block |
| PSD | Power Spectral Density |
| PSS | Primary Synchronization Sequence |
| PUSCH | Physical Uplink Shared Channel |
| RACH | Random Access Channel |
| RAT | Radio Access Technology |
| RBR | Recommended Bit Rate |
| RF | Radio Frequency |
| RRC | Radio Resource Control |
| SoC | System-on-a-Chip |
| SC-FDMA | Single-Carrier, Frequency Division Multiple Access |
| SFBC | Space Frequency Block Coding |
| SIB | System Information Block |
| SIM | Subscriber Identity Module or Subscriber Identification Module |
| SNR | Signal to Noise Ratio |
| SRS | Sounding Reference Signal |
| SSS | Secondary Synchronization Sequence |
| TDD | Time Division Duplex |
| Tx | Transmitter |
| UE | User Equipment |
| UL | Uplink |
| USS | UE-specific Search Space |
| WB-LTE | Wideband LTE (i.e., corresponds to legacy LTE) |
| ZC | Zadoff-Chu algorithm |

The various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method by a wireless device, comprising:
transmitting a first message that comprises data;
starting a timer upon the transmission of the first message;
deferring transmission of a second message that also comprises the data until at least a certain amount of time has elapsed on the timer since the transmission of the first message, the certain amount of time to defer the transmission of the second message depending on a bit rate indicated by the second message.

2. The method of claim 1, wherein the deferring includes waiting to generate the second message until at least the certain amount of time has passed.

3. The method of claim 1, further comprising, while deferring the transmission of the second message, determining not to transmit the second message.

4. The method of claim 3, wherein the determining not to transmit is responsive to determining a change in a condition of the wireless device.

5. The method of claim 3, wherein the determining not to transmit is responsive to determining that the second message is no longer applicable.

6. The method of claim 1, wherein the deferring is responsive to determining that each of the first and second messages comprises the data.

7. The method of claim 1, further comprising transmitting the second message after the certain amount of time.

8. The method of claim 1:
further comprising determining whether the first and second messages are either both associated with uplink transmissions or both associated with downlink transmissions; and
wherein the deferring is responsive to determining that the first and second messages are either both associated with uplink transmissions or both associated with downlink transmissions.

9. The method of claim 1, further comprising transmitting the second message responsive to determining that the timer indicates that the certain amount of time has elapsed.

10. The method of claim 1, further comprising running the timer to indicate an expiration after the certain amount of time has elapsed responsive to transmitting the second message.

11. The method of claim 1, wherein the timer is selected based on whether the first and second messages are either both associated with uplink transmissions or both associated with downlink transmissions.

12. The method of claim 1, wherein the certain amount of time to defer the transmission differs is based on whether the bit rate indicated by the second message is different from a current bit rate assigned to a logical channel over which the first message was transmitted.

13. The method of claim 1, wherein the timer is selected based on whether the first and second messages are associated with a same logical channel.

14. The method of claim 1, wherein the data is comprised in a field or combination of fields within the second message and is also comprised in a corresponding field in the first message.

15. The method of claim 1, wherein the data is comprised in a combination of fields of the second message and is also comprised in corresponding fields in the first message.

16. The method of claim 1, wherein deferring the transmission until at least the certain amount of time has elapsed is in accordance with having previously received an indication of the certain amount of time from a network node.

17. The method of claim 1, wherein the first and second messages are associated with querying a network node about a recommended bit rate (RBR).

18. The method of claim 1, wherein the first and second messages are either both associated with uplink transmissions or both associated with downlink transmissions.

19. The method of claim 1, wherein the first and second messages are associated with a same logical channel.

20. The method of claim 1:
further comprising determining whether the first and second messages are associated with a same logical channel; and
wherein the deferring is responsive to determining that the first and second messages are associated with the same logical channel.

21. The method of claim 1, further comprising:
determining whether a timer associated with deferring a transmission of a third message on a certain uplink or downlink logical channel is configured and not running for that certain uplink or downlink logical channel; and
transmitting the third message on that certain uplink or downlink logical channel responsive to determining that the timer associated with deferring the transmission of the third message on the certain uplink or downlink logical channel is configured and not running for that certain uplink or downlink logical channel.

22. A wireless device, comprising:
processing circuitry;
memory containing instructions executable by the processing circuitry whereby the wireless device is operative to:
transmit a first message that comprises data;
start a timer upon the transmission of the first message;
defer transmission of a second message that also comprises the data until at least a certain amount of time has elapsed on the timer since the transmission of the first message, the certain amount of time to defer the transmission of the second message depending on a bit rate indicated by the second message.

* * * * *